Figure 1:
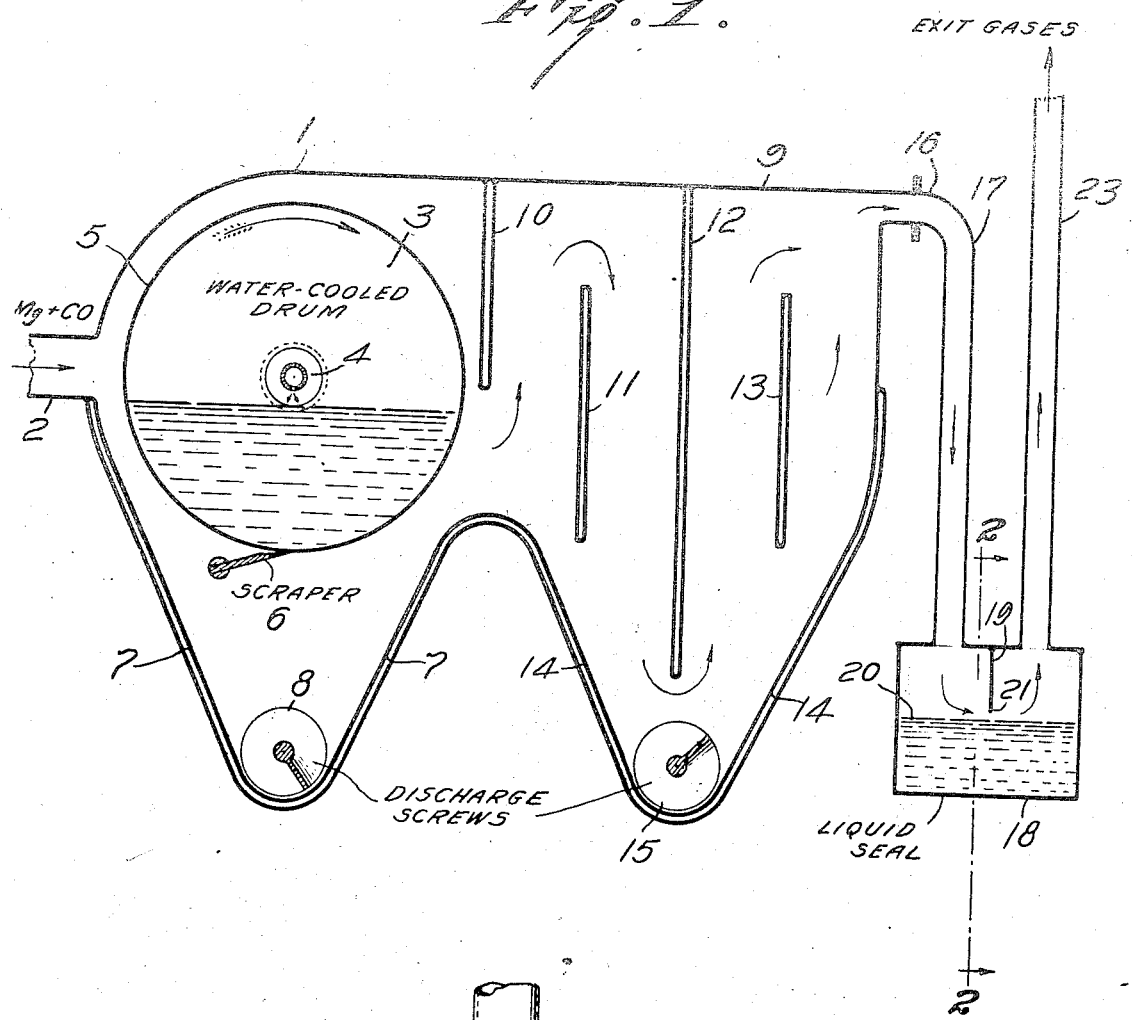

INVENTOR.
FRANK R. KEMMER,
ATTORNEY.

Patented July 4, 1939

2,164,410

UNITED STATES PATENT OFFICE 2,164,410

METHOD OF AND APPARATUS FOR CONDENSING

Frank R. Kemmer, Larchmont, N. Y., assignor to Magnesium Products, Inc., Wilmington, Del., a corporation of Delaware Application July 8, 1933, Serial No. 679,498

7 Claims. (Cl. 75—67)

This invention relates to the condensing of magnesium vapors, more particularly to a method of and an apparatus for condensing such vapors when mixed with other gases so as to prevent chemical reaction with the magnesium.

It is now recognized that mixtures of magnesium vapors and CO, for example, obtained by the reduction of a magnesium oxide ore and carbonaceous material, for example, are unstable in that at certain temperatures there is a reaction between the magnesium and the CO to produce magnesium oxide, thus destroying the efficiency of the operation. It has been recognized that if a mixture of magnesium vapors and CO is rapidly cooled from a temperature above such reversion point to a relatively low temperature this reversion of magnesium to a magnesium compound may be almost entirely prevented.

This application is a continuation in part of my application Ser. No. 542,104, filed June 4, 1931, in which I have described the rapid cooling of the mixture of Mg vapor and CO, in a water-cooled condenser, in order to prevent reversion reactions from taking place which would tend to reoxidize the magnesium.

Also in my copending application Serial No. 664,932, filed April 7, 1933, and entitled "Method of and apparatus for condensing magnesium" I have described a method of quickly cooling and condensing such magnesium vapors by causing the same to contact with a film of an oil which cools, condenses and protects the magnesium from undesirable reactions.

While such a process is perfectly feasible and has been operated with success, I find that certain disadvantages are inherent therein. The resultant product is a mixture of finely divided magnesium and oil, making it necessary to remove most of the oil from the magnesium prior to the next stage of the operation. This requires various types of apparatus such as are well known and which may be used with good results, but they introduce elements of cost in the equipment, in the operation thereof and increase the cost of maintenance.

The present invention is intended to provide a method of and an apparatus for condensing such magnesium vapors without the use of a liquid condensing medium and without diluting the vapors to an undesirable extent. The invention further contemplates such a quick and drastic cooling from a high temperature to substantially atmospheric temperatures that no appreciable reaction of the magnesium with other constituents of the vapors can take place.

I have found that the condensation of magnesium vapor from such a mixture to finely divided magnesium powder and its preservation in said metallic state depends on the very sudden and drastic chilling of such mixture from above 1200° C. to a very low temperature. The condensation phenomenon is very beautifully exhibited by placing a cold iron bar into a stream of the hot mixture of magnesium vapor and carbon monoxide gas for an interval of time so short that the bar cannot become appreciably heated and then suddenly withdrawing said bar. The bar on withdrawal is found to be completely covered throughout the length of insertion in the gaseous mixture with finely divided solid magnesium particles which on coming into the air ignite immediately and the "scintillating" oxidation follows rapidly along the bar as it continues to be withdrawn. This experiment shows very strikingly the fact of condensation of the magnesium vapor to its finely divided and solid metallic state. The cold iron bar has acted as a very effective condenser but does not serve as a collector of the powder in a commercial or practical way.

The system described herein successfully overcomes the difficulties inherent in other types of water cooled condensers. It consists of a chamber built up of walls which may be water cooled and in the interior of which is mounted a water cooled drum (interior cooling) the periphery of which is caused to come practically up to the point of entry into the condenser of the gaseous mixture of Mg and/or CO and/or other gases. This permits instantaneous condensation of magnesium metal. A scraper is provided to remove the thin film of finely divided solid magnesium particles so that the condensing efficiency of the water cooled drum surface is at all times preserved in its high state of efficiency. By means of a water cooled screw the finely divided magnesium powder may be cooled to room temperature prior to discharge or below room temperature by the use of supplemental brine refrigeration.

Figure 2:
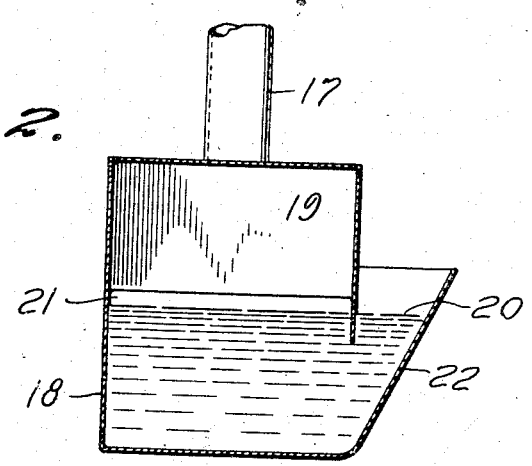

In the accompanying drawing constituting a part hereof and in which like reference characters indicate like parts:

Figure 1 is a vertical, longitudinal, cross-sectional view of an apparatus adapted for the practice of the present invention, and Figure 2 is an enlarged, vertical, cross-sectional view of the liquid seal arrangement taken along line 2—2 of Figure 1.

The apparatus generally consists of a shell 1 of any suitable material, which may be exposed to the air so that it is air cooled or may be cooled by a water spray or water jacket and an opening 2 conducts mixtures of magnesium vapors and gases, such as CO, from the furnace to the cooling and condensing device. A drum 3 within shell 1 is mounted for rotation on shaft 4, by means not shown. The surface 5 of the drum is in close proximity to the inlet opening 2 and a scraper or other device 6 is arranged usually at the lower portion of the drum 3 to scrape or remove from said surface 5 any accumulation of deposits of magnesium powder which may have formed. The lower portion of the shell is tapered as shown at 7 to form a trough and a screw conveyor 8 which may or may not be water cooled is inserted therein. This serves as means for removing the powdered magnesium from the apparatus and in the normal operation thereof such powder has been cooled to about atmospheric temperature before removal.

Connected to or constituting a part of shell 1 is an additional shell 9 having therein a series of baffles 10, 11, 12 and 13 to cause the gases coming from shell 1 to flow in a winding and twisting path, so as to contact with said baffles. The baffles may be cooled artificially as by means of circulating water in a jacket attached to or constituting part of said baffles. As shown, the baffles are hollow so that the water or other cooling medium may circulate therethrough by means of inlet and exit pipes (not shown) suitably connected thereto. The lower portion 14 of shell 9 is tapered to form a trough within which is a screw conveyor 15 similar to conveyor 8.

Gases flowing from shell 9 pass through exit opening 16 and then downwardly through pipe 17 into liquid seal arrangement 18. Said liquid seal is provided with a baffle 19 and liquid up to level 20 which is just short of the lower end of baffle 19 forming a narrow space 21 for gases to flow. An extension 22, as best shown in Figure 2, provides an opening for inspection for filling and for emptying the seal 18. An exit pipe 23 on the side of baffle 19 opposite to pipe 17 allows the removal of the waste gases from the system.

In the operation of the device a mixture of magnesium vapors and CO, for example, enters opening 2 at a temperature of approximately 1200° C. or higher and immediately impinges upon the surface 5 of drum 3 which is rotating relatively slowly. By reason of the cooling effect of the water within the drum there is a strong chilling of the magnesium vapors to form powder which is cooled to a temperature considerably below 100° C. and ordinarily is in the neighborhood of 30° C. or even less. This forms a thin layer of magnesium powder on the drum 3 and thereby the magnesium is removed from intimate admixture with CO, whereby contact with CO is not detrimental, greatly decreasing any danger of reversion taking place. The powder is carried to the lower side of the drum where scraper 6 removes the same and restores a clean, cool surface for the condensing of magnesium. The powder falls into conveyor 8 and is thereby removed from the system. The powder may be transferred to a chamber having an inert or reducing atmosphere such as hydrogen. Usually the CO in the system imparts sufficient protective gas to prevent access of air but I also contemplate operating the system in the presence of an indifferent gas, for example, an inert or reducing atmosphere such as hydrogen, helium or the like which may be introduced into the apparatus by a pipe or the like.

The gases containing some magnesium which may have escaped condensation on the rotating water cooled drum are carried past the baffles 10, 11, 12 and 13 where they are further cooled, causing the condensation of additional magnesium powder which may accumulate on the baffles and fall into trough 14 or be scraped from the baffles and carried away out of the system by conveyor 15.

The exit gases pass through pipe 17 and through the liquid seal 18 where they are scrubbed at the surface 20 of the liquid to remove any magnesium powder carried along by the gas and the spent gases are removed from pipe 23.

Although I have described my invention setting forth a single embodiment thereof and indicating the normal operation of the system, it will be apparent to those skilled in the art that various changes and modifications therein may be made within the scope of the invention. For example, the scraper 6 may be placed in a different position and the drum 3 may be replaced by a stationary cool surface and a cleaning device may be moved over the surface thereof to remove deposits as they accumulate. The baffles may be removed or a larger number may be used and the liquid seal may be replaced by a bag or other dust collecting apparatus. The baffle 19, liquid level 20 and space 21 act as a pressure regulator for the system, the pressure of which may be varied by varying the size of the space 21. A pressure regulator may be added to the system to automatically maintain the system under pressure to any desired degree, so that air cannot enter the system. All of the parts of the condenser may be water cooled. These and other changes may be made in my invention without departing from the principles thereof. My invention is to be broadly construed and to be limited only by the claims appended hereto.

By the term "immediately impinge" as used in some of the claims I mean that the gases are caused to make contact with the cooled surface as soon as possible after they leave the furnace so that they make contact with the chilled surface before there is an opportunity for cooling of the gases into the range of temperature where the reverse reaction between Mg and CO takes place to any substantial degree.

What I claim is:

1. Apparatus for condensing magnesium vapors contained in a gaseous medium comprising a chamber, an opening therein for the introduction of said gas, an artificially cooled surface, means for directing said gas so as to cause it to immediately impinge thereon and means including a circulating fluid for maintaining said surface at a sufficiently low temperature so that magnesium vapors are rapidly cooled through the range of temperature in which magnesium is reactive with CO whereby the magnesium is condensed thereon and reaction with other constituents of the gas is substantially prevented, and a pressure regulator in the system.

2. Apparatus for condensing magnesium vapors contained in a gaseous medium including CO resulting from the reduction of magnesium oxide ore with carbon comprising a device for the generation of magnesium vapors, a condenser connected thereto, and a pressure regulator situated beyond said condenser and operatively connected to the exit end thereof, said regulator being adapted to maintain a higher pressure in said condenser than prevails beyond said regulator.

3. A method which comprises heating an oxide ore of magnesium with a carbonaceous reducing medium to produce a gaseous mixture containing magnesium vapors and CO at a sufficiently high temperature so that there is substantially no reaction therebetween, leading said mixture to a clean cold surface and causing the same to impinge directly thereon immediately upon leaving the reaction chamber, the cooling effect of said surface acting to reduce the temperature of said mixture sufficiently rapidly to condense said vapors and to substantially prevent reaction between magnesium and CO, and continuously moving said surface to present a clean cold portion to said mixture.

4. A method which comprises heating an oxide ore of magnesium with a carbonaceous reducing medium to produce a gaseous mixture containing magnesium vapors and CO at a sufficiently high temperature so that there is substantially no reaction therebetween, leading said mixture to a clean cold surface and causing the same to impinge directly thereon immediately upon leaving the reaction chamber, the cooling effect of said surface acting to reduce the temperature of said mixture sufficiently rapidly to condense said vapors and to substantially prevent reaction between magnesium and CO, continuously moving said surface to present a clean cold portion to said mixture and continuously scraping off the metal adhering to said surface.

5. An apparatus comprising a reaction chamber for the production of a gaseous mixture of magnesium and CO, a condenser, a connection therebetween, a cooled surface in said condenser, said connection being so located as to cause said gaseous mixture to impinge directly on said surface, and means for continuously moving the same to present clean surfaces to said mixture.

6. An apparatus comprising a reaction chamber for the production of a gaseous mixture of magnesium and CO, a condenser, a connection therebetween, a cooled surface in said condenser, said connection being so located as to cause said gaseous mixture to impinge directly on said surface, means for continuously moving the same to present clean surfaces to said mixture and means for continuously scraping condensed metal from said surface.

7. An apparatus comprising a reaction chamber for the production of a gaseous mixture of magnesium and CO, a condenser, a connection therebetween, a continuously rotating drum having a cooled surface in said condenser, said connection being so located as to cause said gaseous mixture to impinge directly on said surface, and means for continuously presenting clean surfaces to said mixture.

FRANK R. KEMMER.